Figure 8:
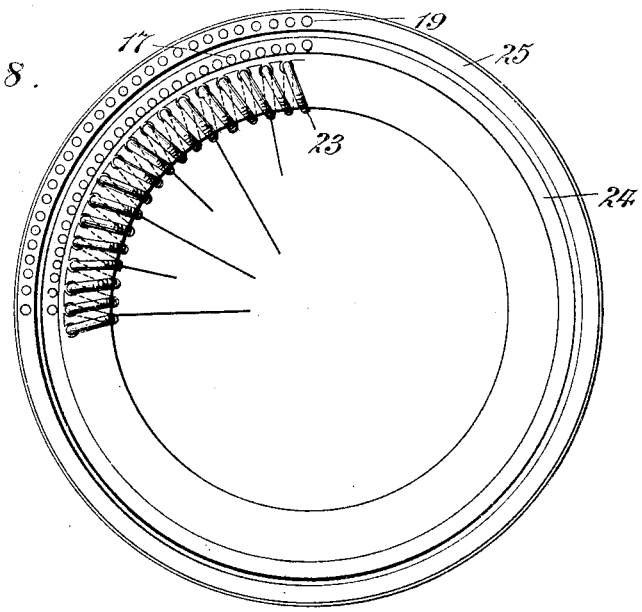

No. 802,632. PATENTED OCT. 24, 1905.
E. R. GILL.
SELF PROPELLED VEHICLE.
APPLICATION FILED JAN. 2, 1901.
6 SHEETS—SHEET 1.
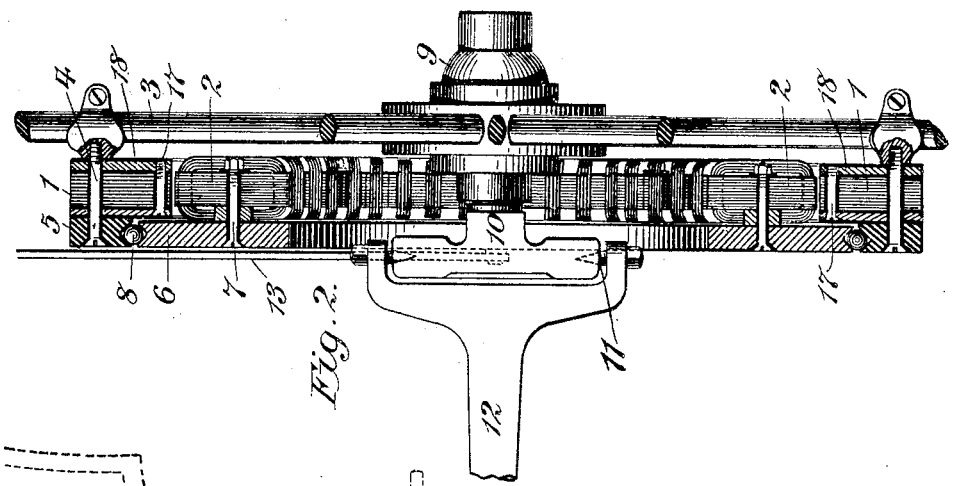
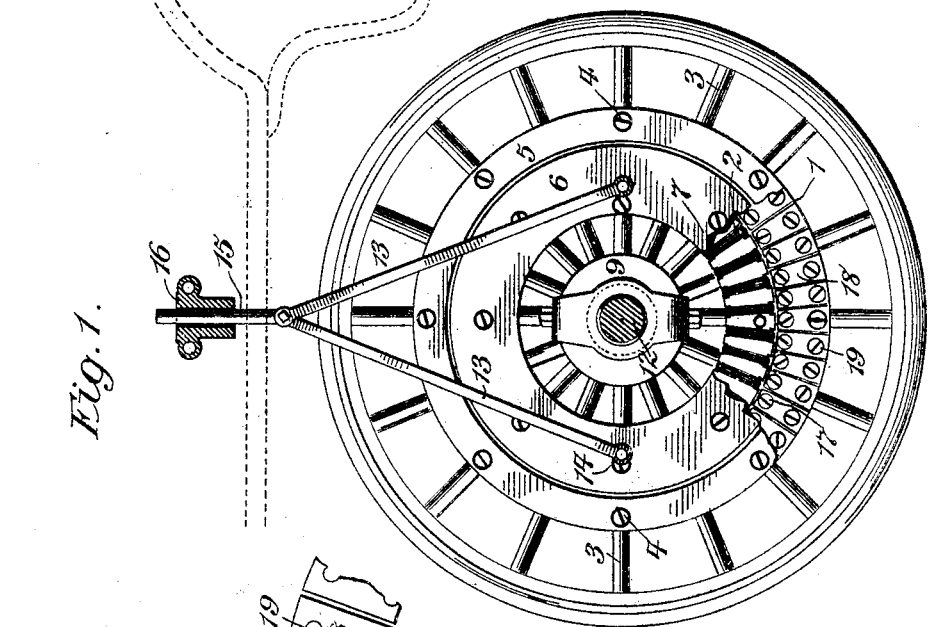
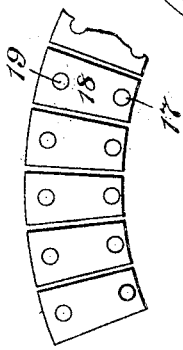
Witnesses
Edward Dowland.
James Laing.
Edwin R. Gill
Inventor
By his Attorney H. S. MacKaye No. 802,632. PATENTED OCT. 24, 1905.
E. R. GILL.
SELF PROPELLED VEHICLE.
APPLICATION FILED JAN. 2, 1901.
6 SHEETS—SHEET 2.
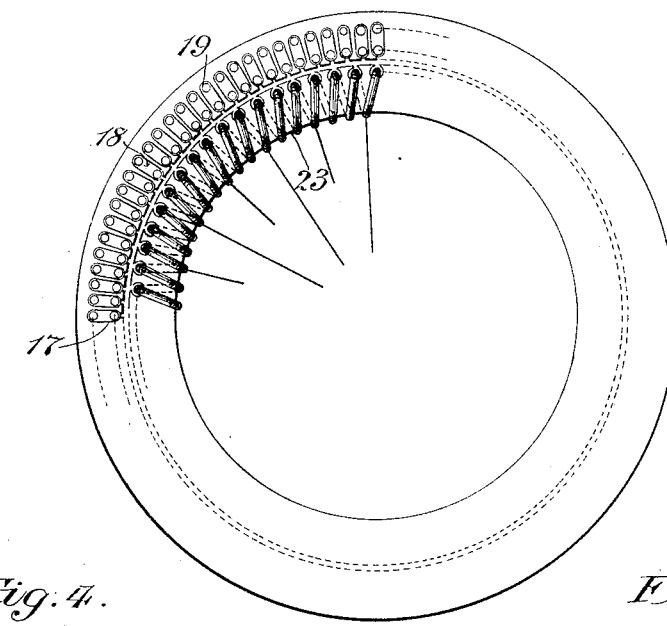
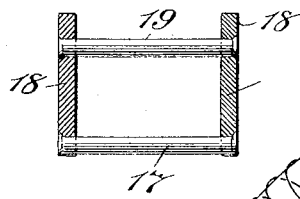
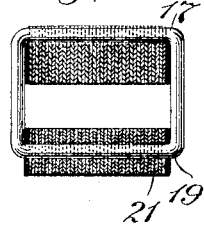
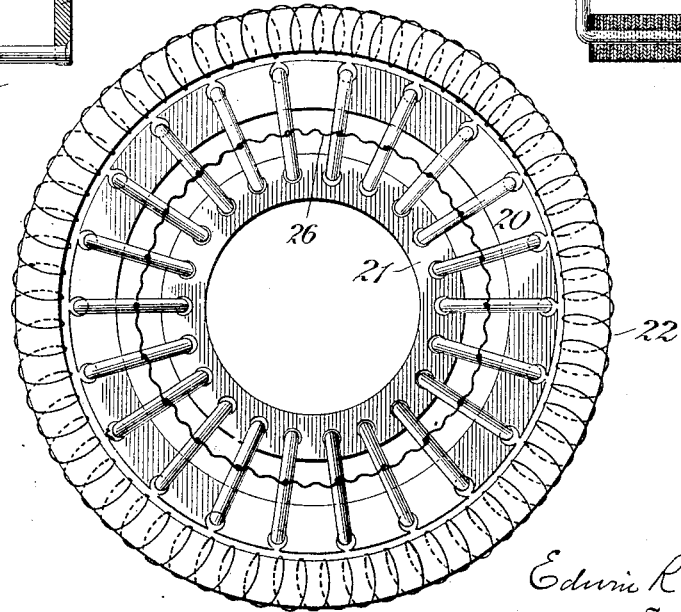
Witnesses
Edward C. Rowland
James S. Lanig
Edwin R. Gill
Inventor
By his Attorney H. Mackaye No. 802,632. PATENTED OCT. 24, 1905.
E. R. GILL.
SELF PROPELLED VEHICLE.
APPLICATION FILED JAN. 2, 1901.

6 SHEETS—SHEET 3.

Witnesses
Edward G. Rowland.
James ...

Edwin R. Gill
Inventor

By his Attorney H. S. Mackaye

No. 802,632. PATENTED OCT. 24, 1905.
E. R. GILL.
SELF PROPELLED VEHICLE.
APPLICATION FILED JAN. 2, 1901.

6 SHEETS—SHEET 5.

Witnesses
Edward Rowland
James L. Harris

Edwin R. Gill
Inventor
By his Attorney
H. S. Mackaye

No. 802,632. PATENTED OCT. 24, 1905.
E. R. GILL.
SELF PROPELLED VEHICLE.
APPLICATION FILED JAN. 2, 1901.

6 SHEETS—SHEET 6.

Witnesses
Edward C. Rowland
James Waring

Edwin R. Gill
Inventor
By his Attorney H. S. MacKay

UNITED STATES PATENT OFFICE.

EDWIN R. GILL, OF NEW YORK, N. Y.

SELF-PROPELLED VEHICLE.

No. 802,632.     Specification of Letters Patent.     Patented Oct. 24, 1905.

Application filed January 2, 1901. Serial No. 41,770.

*To all whom it may concern:*

Be it known that I, EDWIN R. GILL, a citizen of the United States, residing in the city, county, and State of New York, have invented a certain new and useful Improvement in Self-Propelled Vehicles, of which the following is a specification.

The great majority of self-propelled vehicles in use hitherto employ more or less gearing between a motive device carried by the vehicle-body on the one hand and the driving-wheels on the other. Such gearing is a notorious source of noise, dirt, vibration, and expense for repairs. In my application for Letters Patent of the United States, Serial No. 736,572, filed November 11, 1899, I have described an electric motor and wheel for automobiles which not only renders all gearing unnecessary, but presents other important practical advantages set forth in said application. In an automobile of this type variations of running speed must correspond to changes in the speed of the motor. Where a number of motors can be used, as set forth in my application aforesaid, and where direct-current motors are employed, what is known as "series multiple control" can be appropriately employed for producing changes of speed. The use of direct-current motors in this connection, while practicable, involves certain well-known objections which can be avoided if alternating-current motors are used. The use of alternating-current motors of all known types, however, has the great disadvantage that it does not admit of considerable variations in speed at constant load or of load at constant speed or of simultaneous changes in both speed and load, which conditions are precisely those most necessary to be met in a self-propelled vehicle of ideal equipment.

My present invention involves the production of alternating-current motors of the induction type which shall be capable of meeting the conditions above named, particularly when changes in pole-grouping are desired. My present invention covers a method and means of power transformation and variable transmission wherein such motors are capable of being utilized to maximum advantage in automobiles and like devices.

Series-wound motors of the direct-current type have been well nigh universally employed on self-propelled vehicles hitherto because of the advantageous relations existing between speed and torque in such motors. In series-wound motors the maximum torque is present on starting when no counter-electromotive force is developed. The greatest efficiency is present at a speed corresponding to practically no current, while the maximum output of a given motor corresponds to a counter-electromotive force of fifty per cent. of the impressed electromotive force. It has been recognized that if alternating-current induction-motors (and particularly rotary-field alternating-current motors) could be constructed to exhibit these favorable characteristics of direct-current series-wound motors, a highly desirable motor would be produced. My novel method and means is designed to conform to this ideal.

My present invention is illustrated in the accompanying drawings, wherein—

Figure 9:
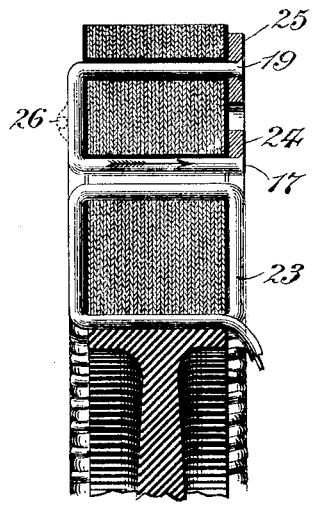
Figure 10:
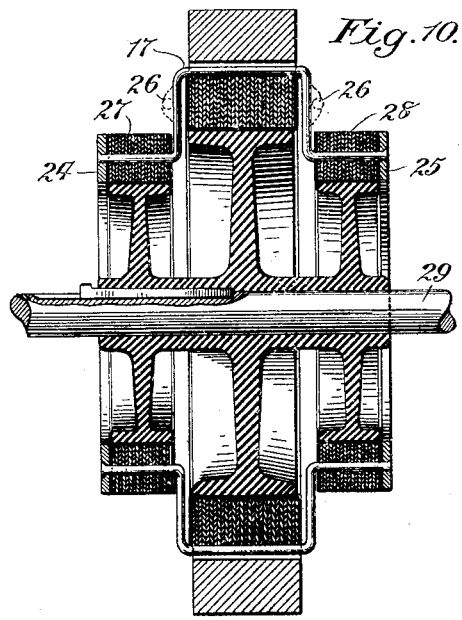
Figure 11:
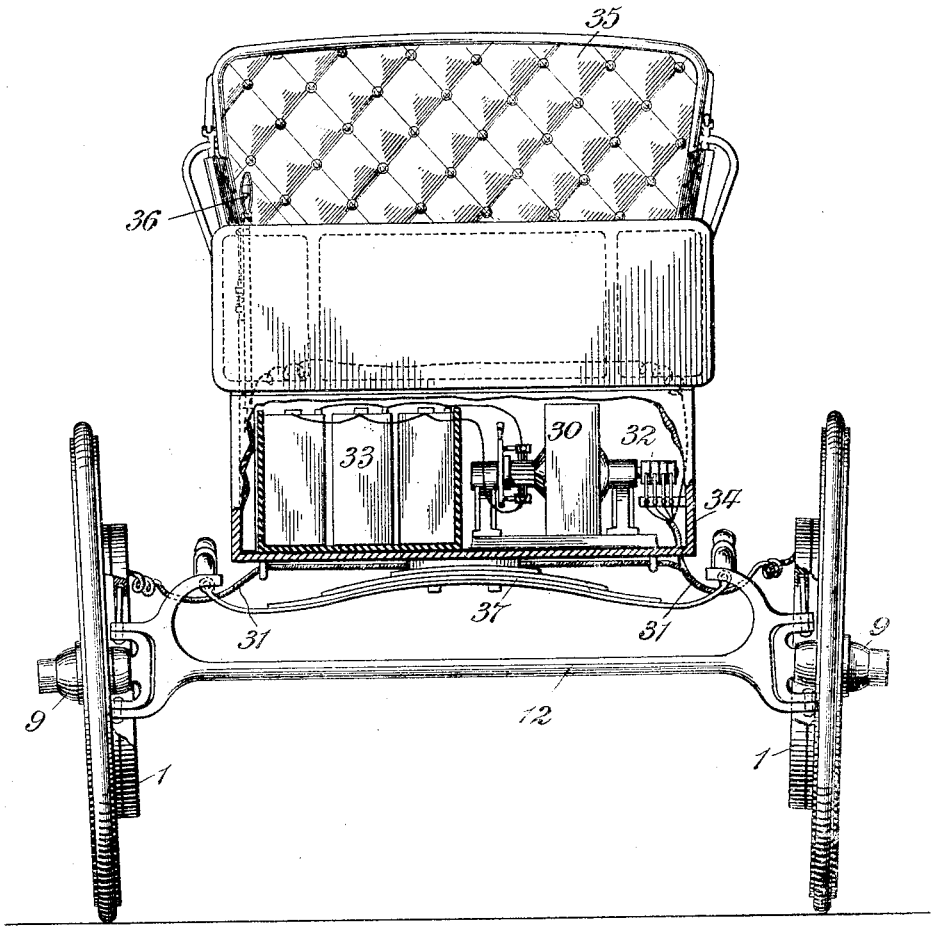
Figure 12:
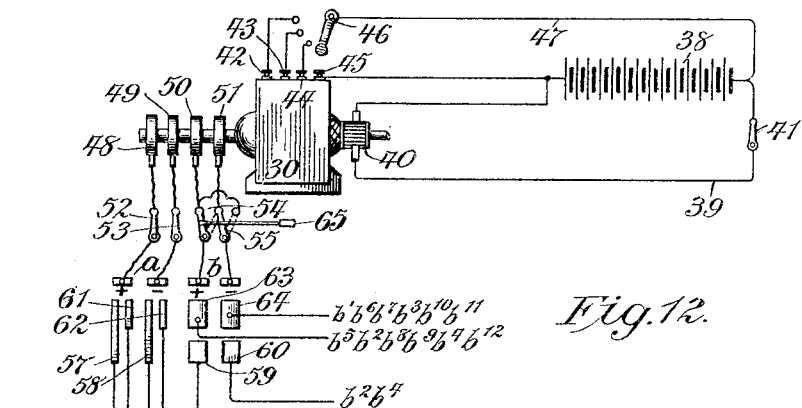
Figure 13:
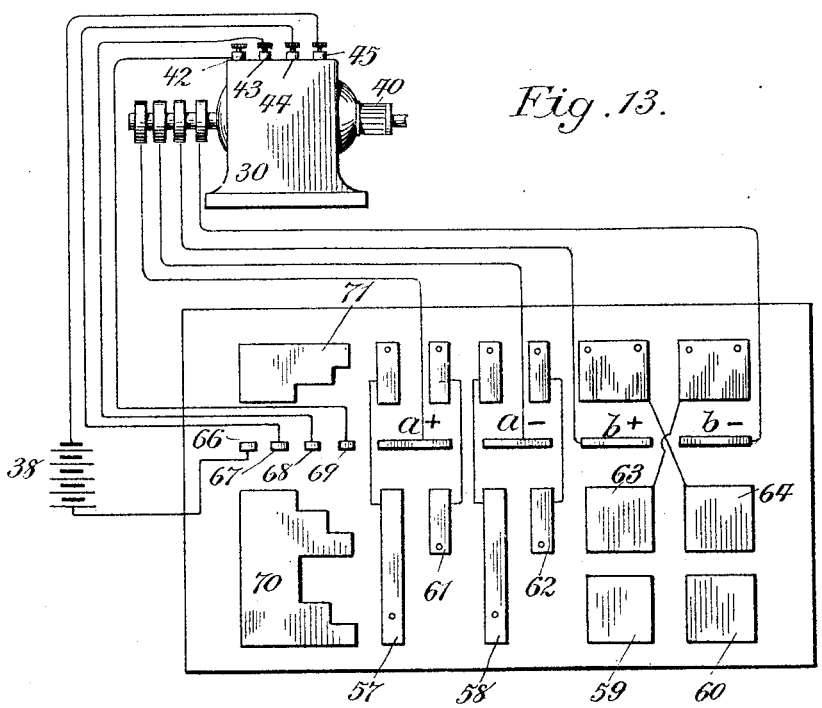
Figure 14:
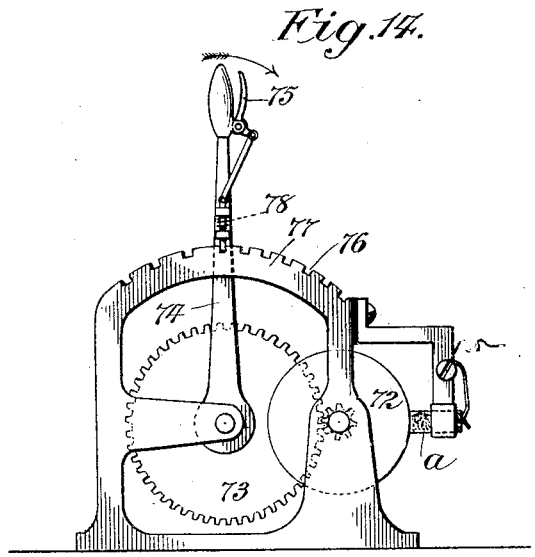

Figure 1 is a side view, looking outward, of an automobile-wheel provided with one form of my improved motor. Fig. 2 is a vertical section of the same. Fig. 3 is a detail view of a portion of the induced member of the motor shown in Figs. 1 and 2. Fig. 4 is a sectional detail view of the winding as employed on the induced member of the same motor. Fig. 5 is a side view illustrating a modified form of induced member and accompanying reactive body. Fig. 6 is a sectional view showing the winding on the induced member shown in Fig. 5. Fig. 7 shows in side view a quadrant of still another form of induced member. Fig. 8 shows the other side of the same kind of induced member, ninety degrees thereof being shown. Fig. 9 is a sectional view of both inducing and induced members of the form of motor illustrated in Figs. 7 and 8. Fig. 10 illustrates in section still another form of motor employing reactive masses on one or both sides of the induced member. Fig. 11 illustrates a modified combination of carriage-wheel and attached motor and illustrates the entire automobile system in place upon a vehicle. Figs. 12, 12$^A$, and 12$^B$ show in diagram the various electrical connections employed for controlling the speed and direction of movement of the vehicle. Fig. 13 is a diagrammatic development of a preferred form of controller for my improved propelling system, and Fig. 14 is a side view of one form of controller appropriate in this connection.

In this specification and accompanying drawings I have everywhere shown and described rotary-field motors employing true polyphase currents. It is to be understood, however, that my improvement applies to a broader field than this and that the motors herein shown and described are but types of what are known as "induction-motors," by which term I mean alternating-current motors wherein the operation depends wholly or in part upon the inducing of currents in one member by changes in magnetic conditions in the other member. Nevertheless, inasmuch as the peculiar advantages of my improvement find their perfection in rotary-field polyphase induction-motors, I have chosen to confine the discussion of theory as well as the description of construction herein to this specific type of motor. Hereinafter the two parts of the induction-motor will be referred to as "armature" and "field-magnet," the former being understood to be the induced and the latter the inducing member, whichever is assumed to rotate.

Rotary-field induction-motors are run normally in the best practice with about five per cent. slip. It has been found that sudden increase of load brought upon a motor of this type running normally produces a corresponding decrease of torque, which often results in stoppage of the motor. This is due to the fact that the first decrease in speed due to increased load greatly increases the induction and consequent current in the coils of the armature, the result being a magnetic reaction of armature upon field-magnet which distorts the inducing-field, and so weakens the torque. For the same reason these motors can only be started under load by introducing such a resistance at starting as will weaken the armature-current and prevent damaging distortion of the inducing-field of force. Devices have hitherto been employed for use of such resistances during starting and for cutting them out during running, it being obvious that continual use of resistance greatly lessens the available output and efficiency of the motor. Such devices are not expedient for my purposes, and, moreover, they entirely fail to meet the objection first above mentioned—viz., the stopping of the motor on sudden increase of load. Rotary field-motors, then, while exerting a proportional increase of induction as the slip increases, nevertheless lose in torque on slowing up, because the increased induction produces a reaction similar to that exerted by the secondary of a converter, and this reaction produces a lessened torque with increase of load, which is the converse of the desired condition. It is the main advantage of my broad invention that this hurtful armature reaction is practically done away with without appreciable increase in conductor resistance at high speeds and by entirely automatic means preferably internal to the motor. Thus the increased inducing action primarily incident to increased slip is allowed to produce a torque, increasing with the load, and so insure constant reliable running with varying loads. For this purpose I force some or all of the induced armature-current to pass through an appropriate magnetic field of high permeability, preferably presenting a closed magnetic circuit. I prefer to accomplish this by surrounding prolongations of some or all of the armature-working conductors with iron laminated at right angles to the direction of the induced currents in said prolongations. These iron masses and inclosed conductors thus form reactive devices or sources of counter electromotive force. They should be outside of the controlling influence of the field-magnet, by which is meant influence of sufficient power to determine by induction the instantaneous direction of currents in portions of conductors reached by said influence. These reactive devices, not being controlled by the primary or immediate influence of the field-magnet, should be so proportioned as to be capable of always opposing a reaction increasing with the periodicity of the currents in the working conductors and their prolongations. As this periodicity increases with the slip, it is evident that the greater the slip the greater the effect of these reacting devices in opposing the current in the armature. Hence the tendency to produce currents yielding hurtful reaction of armature upon field-magnet is opposed by a proportional and automatically-variable choking effect in the reactive devices aforesaid. I have found that by the employment of an induced member made according to these principles an alternating-current voltmeter shows almost no variations between full speed and no speed when connected across the terminal of one phase at the motor. A motor thus constructed will exert an increased torque with increased load, and, if used upon a self-propelled vehicle, constant speed can be obtained for various grades (within limits) by merely increasing the current delivered to the field-magnet.

In Figs. 1, 2, 3, and 4 I have shown one form of my motor and its mode of application directly to a driving-wheel. In this embodiment of my invention the armature 1 is the rotor and surrounds the field-magnet 2 concentrically. The armature 1 is attached to the spokes 3 of the driving-wheel, as by the occasional bolts 4. A supporting-ring 5 on the armature is concentric with a bearing-ring 6, bolted, as at 7, to the field-magnet 2. Between the rings 5 and 6 are balls 8 in appropriate retaining-grooves. It will thus be seen that the armature carries the field-magnet by means which permit relative rotation of the two, both being carried by the wheel 3. If desired, the driving-wheel 3 may also be a guiding-wheel, in which case the hub 9 turns on a short axle which is borne by a vertical support 10, pivoted, as at 11, to the main carriage-axle 12. To prevent rotation of the field-magnet, the retaining-bars 13 are pivoted to the field-magnet at 14 and to each other and the pintle 15 at their upper ends.

The pintle is held by a socket 16, in which it is free to reciprocate for spring movement and to turn when the wheel moves for guiding. The details so far given are explained fully in my application aforesaid, Serial No. 736,572, wherein this arrangement of wheel and motor is broadly claimed, the same forming no indispensable part of my present invention. In the form shown in Figs. 1 and 2 the field-magnet is wound as a sort of Pacinotti ring wherein polyphase currents can be made to cause a rotation of polar lines in a well-known manner. The armature, of a modified squirrel-cage type, is provided, as usual, with a laminated core, and short copper bars 17, set into the iron across the inner concave face of the armature, act to clamp the laminations solidly together by means of copper segments 18. In Figs. 1 and 3 the two opposite plane faces of the armature are shown, and it will be seen that the usual end rings used in squirrel-cage armatures are cut radially, so as to form opposed segments, one at each end of each working conductor 17. This subdivision of the rings prevents formation of the circuits ordinarily found in squirrel-cage armatures; but the currents induced in the bars 17 return through virtual prolongations, taking the form of return-bars 19, extending from each segment 18 to its fellow on the opposite plane face of the armature. Inspection of Fig. 4 will make it clear that a closed circuit is formed at each working conductor, a portion 19 of which, as shown in Figs. 1 and 3, passes through the armature-core, being surrounded by laminations of iron at right angles to its length. As shown, the bars 17 are merely let into transverse grooves or spaces in the concave armature-face. This is so that they may be subjected to the full action of the inducing magnetic field generated by the coils upon the field-magnet 2. On the contrary, the bars 19 pass bodily through the iron core, so as to create magnetic lines in a closed laminated magnetic circuit, and so produce a maximum reactive effect. The radial depth of the armature-core must be sufficient to accommodate the field-magnet's magnetic lines and leave the iron, through which pass the bars 19, substantially free of magnetism, so that the magnetic whirls set up by the conductor 19 will not be interfered with. In other words, there must be sufficient iron in the armature to insure the prolongation 19 passing outside of the "controlling influence" of the field-magnet. Where found desirable, some of the working circuits need not be completed through reactive bars 19, it being an appropriation of the broad idea of my invention to apply it to any number of working circuits. In its broadest aspect also my invention is not restricted to the use of reactive means presenting a closed magnetic circuit in the neighborhood of the reactive bars. It will be found best to thoroughly insulate the various parts, so as to confine the induced circuits to the short copper paths intended for them, as otherwise the conductive effect of the iron laminæ is a source of annoyance. This is indicated by heavy black lines in Figs. 2 and 3.

In the form thus far described the core of the armature is integral with the reactive body. In Figs. 5 and 6 is shown one form of motor conforming to my invention wherein the armature and reactive device are separate elements, while mechanically connected so as to rotate always together. Here the field-magnet or inducing member lies outside of the armature and either may rotate. The field-magnet is indicated diagrammatically as a Gramme ring. The armature-core is shown at 20, and the working conductor 17, after crossing the armature-face in appropriate slots or grooves, is joined at both ends to a reactive bar 19, passing through the concentric laminated core 21 out of the controlling influence of the field-magnet coils 22. As shown in Fig. 6, the bar 17, bar 19, and their radial connections preferably form a single integral copper loop.

In Figs. 7, 8, and 9 the armature is again outside and a Gramme-ring field-magnet 23 is shown inside. In this modified form of my motor the copper segments 18 join the bars 17 and 19 on one plane face of the armature-ring, while on the other face (see Figs. 8 and 9) two conducting-rings 24 25 are employed. The ring 24 joins all the working conductors 17, while the ring 25 joins all the reactive bars 19.

In Fig. 9 the relations of the various conductors and iron parts with separating insulation in black are plainly shown. In this form of armature current starting, as shown in Fig. 9 by the arrow on the conductor 17, would take the usual squirrel-cage course through the ring 24 to another working conductor subject to induction opposite in direction. Thus, recrossing the inner face of the armature at such other working conductor, the current would pass up to the corresponding reactive bar 19 and through it to the ring 25, by this ring back to the reactive bar 19, (shown in Fig. 9,) and back through the iron to close the circuit traced at the working bar 17 of Fig. 9. It will be seen that this circuit includes two working bars and two reactive bars in series, thus obtaining the desired reactance proportional to the slip. Squirrel-cage armatures thus constructed with their conducting-rings on the same face of the armature instead of on opposite faces as heretofore I have called "asymmetric-ringed" armatures. While I have illustrated the two rings as carried directly upon the armature-face insulation, it will be obvious that this arrangement is not essential. It is also clear that the asymmetric-ringed type is applicable to such armatures as are exemplified in Figs. 5 and 6, for instance, wherein the reactive body is not integral with the armature-core.

While the reactive means heretofore described are operative for my purposes, the reactance at starting tends to produce a lag or phase displacement which under some circumstances might interfere with operation to some extent. It is one feature of my more specific invention to employ a non-inductive resistance in such a relation to the reactive bars that on starting and at all times of excessive slip a path is afforded for the current whose resistance, while high enough to prevent hurtful current-volume, is independent of the slip. This resistance remains always in shunt; but during normal running it affords no obstacle to the working current, since the low-resistance bars then afford a comparatively easy path, their reactance being reduced, as heretofore described. A preferred form of non-inductive resistance for this purpose is shown in Fig. 5. Here a conductor 26 is provided, forming a closed circuit, said conductor being electrically connected at intervals to the radial connecting-bars joining the working conductors and corresponding reactive bars. A single conductor of high specific resistance, such as of German silver or of iron, may be employed in this connection. The wavy form shown at 26 is intended to indicate the possibility of giving this wire any desired length by bending or coiling the same. The application of the non-inductive high-resistance shunt is shown as applied to the asymmetric-ringed armature at 26 in Fig. 9. As here indicated in dotted lines, the conductor extends at right angles to the radial portions of the U-shaped copper conductors, being soldered to each at the intersection.

In order to further illustrate the great variety of arrangements applicable to my invention without departing from the scope thereof, I have shown in Fig. 10 the use of a squirrel-cage armature whose conducting-rings 24 25 are carried by separate reactive bodies 27 28, carried on the armature-shaft 29 and turning with the armature. Each working conductor 17 is prolonged and its two ends carried directly through said reactive bodies, respectively, in order to reach the rings 24 25. I prefer to make the bodies 27 28 of less diameter than the armature, as shown, in order to avoid the controlling influence of the inducing member.

When found desirable, the non-inductive wire 26 may be applied, as shown in dotted lines in Fig. 10, on one or both sides of the armature. It is obvious that the use of one instead of two reactive bodies 27 28 is within the spirit of my invention.

The various embodiments of my invention herein shown being all adaptations to squirrel-cage armatures they provide means for the purposes described, whose certainty of operation is independent of the number of poles active in the circumference of the inducing member at any time. This fact makes it possible to vary the number of poles produced in the field-magnet, and thus (with a constant periodicity of current delivered) vary the speed of magnetic polar rotation. This is an important feature in my preferred form of self-propelled vehicle, since I prefer to rely upon changes in polar arrangement of inducing magnetic field for changes in driving speed.

One arrangement of the various elements employed in my automobile system is shown in Fig. 11, wherein the wheel-supported motors 1 are shown connected to a rotary transformer 30 by means of a cable 31 and four brushes bearing on a group of four insulated slip-rings 32. The rotary transformer 30 is a well-known type of device acting as a motor driven by direct current (as from the battery 33) and delivering two-phase alternating currents from the two pairs of rings 32. The batteries 33 and transformer 30 are placed within the body 34 of the carriage (or other convenient location) and preferably beneath the seat, the back of which is shown at 35. The controller-handle is shown in Fig. 11 at 36. Its operation is described hereinafter. It will be seen that by this arrangement a wagon-body may be mounted upon ordinary springs 37 on plain axles free of all mechanism. There being no gear connection between the motive power on the carriage-body and the wheels, free relative spring movement of the two is permitted.

An example of electric connections whereby my preferred automobile system may be practically operated is shown in Figs. 12 to 14, inclusive. In Fig. 12 any desired source of direct current is exemplified at 38. This source preferably supplies current of substantially constant potential. The armature of the rotary transformer or motor-generator 30 is fed by one branch circuit 39, entering by the commutator 40. This may be opened or closed by a switch 41. The field-magnet coils of the transformer 30 are brought out to successive terminals 42, 43, 44, and 45. The switch 46 connects the feeding branch 47 to one or another of said terminals, thus including in circuit one or more sections of field-magnet winding, and thus producing various potentials of current delivered to the four slip-rings 48, 49, 50, and 51. The currents delivered by said rings are carried through the switch-arms 52, 53, 54, and 55 to the stationary contact-pieces $a+$ $a-$ and $b+$ $b-$, respectively, of an appropriate controlling device. Under these contact-pieces in Fig. 12 is shown the development of a coöperating drum with movable contact-pieces for producing the necessary circuit changes as the drum is revolved under the stationary contacts. In the drawings I have assumed that increase of speed is produced by change from twelve to four pole arrangement, and vice versa. As these changes occur only in the field-magnet, I have only shown in diagram the continuous windings of the field-magnet. Although speed is gradually developed in practice by proceeding from the twelve to the four pole arrangement, I shall describe the latter first, as being the more simple of the two.

In Fig. 12$^A$ the inducing-coils are indicated at 56. One alternating-current phase is assumed to be delivered from contacts $a+$ and $a-$ and the second phase from $b+$ and $b-$. Hence these are alluded to hereinafter as the $a$ and the $b$ phases, respectively. For four-pole operation the $a$ phase is led into the coil 56 at points ninety degrees apart, as shown at $a'$ to $a^4$, inclusive, within the said coil. The $b$ phase is led to four symmetrically-placed points forty-five degrees from the points of ingress of the $a$ phase. This is shown by the lines $b'$ to $b^4$, inclusive, outside of the coil 56. The wires of like polarity are led in at opposite ends of the same diameter, as shown by the signs near the radial lines in Fig. 12$^A$. These signs for convenience indicate the instantaneous maximum potential condition of the $a$ phase and the potential condition into which the $b$ phase is about entering from zero. The conditions indicated by the signs plus and minus in Fig. 12$^A$ will therefore correspond to magnetic polar rotation in the direction of the arrow in that figure. This condition corresponds to full speed of the vehicle and is produced by turning the controller-drum until the contacts $a+$ and $a-$ and $b+$ and $b-$ come, respectively, over the contacts 57, 58, 59, and 60. The contact 57 is permanently connected, as indicated on the drawings, to $a'$ and $a^3$, thus producing positive polarity at those points. Contact 58 is permanently connected to $a^2$ and $a^4$, thus producing negative polarity at those points. In the same manner the permanent connections (indicated in Fig. 12) for the contacts 59 and 60 will produce the polarities indicated for the $b$ phase in Fig. 12$^A$. The above explanation will make it clear how the poles are increased to twelve in each phase when the controller is turned to bring the additional contacts 61, 62, 63, and 64 under the fixed contacts in Fig. 12. The permanent connections of these additional contacts are indicated in writing on the wires leading therefrom in Fig. 12. Inspection of Fig. 12$^B$ will show that the circuits thus established will produce, respectively, maximum and incipient polarities of opposite signs at points thirty degrees apart for each phase, (or of like sign fifteen degrees apart from phase to phase,) and it will be seen that these still produce rotation in the direction of the arrow. This rotation of magnetic field will be one-third as fast as that in Fig. 12$^A$, assuming the same periodicities in the two cases. As shown in Fig. 12, a handle 65 is so attached to the switches 54 and 55 of one of the phases $b$ that the instantaneous polarities delivered to the controller are reversed. This will result in reversal of the rotation of the magnetic field whatever the position of the controller.

In Fig. 13 is shown a form of controller providing for my preferred mode of vehicle control by combined changes in current strength and pole grouping. Here the stationary contacts $a+$, $a-$, $b+$, and $b-$ are supplemented by four contacts 66 67 68 69, connected, respectively, to one terminal of the current source 38 and the transformer field-magnet terminals 44, 43, and 42. The stopping position of the controller-drum is an intermediate one, and movable contacts for going ahead or backing are arranged to come into play as the drum is turned one way or the other. For going ahead six speeds are provided for, as shown in Fig. 13. The connecting-plate 70 coöperates with the contacts 66 to 69 so as to bring one, two, and three sections of field-magnet into circuit successively in the transformer 30. This corresponds, as shown, to continued twelve-pole grouping in coils 56, and consequently produces a slowly-rotating motor-inducing field of progressively greater power as successive transformer-terminals come into circuit. As the drum is further rotated, the pole groupings are changed to the four-pole arrangement and the current strength delivered drops at first to minimum, owing to the shape of the plate 70, as illustrated. Still further rotation gives successively stronger currents with full-speed motor-field rotation. Upon backward rotation of the drum the necessary reversal of one phase is produced by the electrical connections indicated, while the plate 71 produces successive increases in driving-current. Provision is only made for the twelve-pole condition on the reversing side of the controller-drum, as full speed backward is not desirable for automobiles.

One form of controlling-handle appropriate for mechanical production of forward and backward drum movement is shown in Fig. 14. Here the drum 72 is moved under the carbon contacts $a$ by means of the gear-wheel 73, meshing with a small pinion on the drum-shaft, (shown in dotted lines.) The handle 74 impels the gear 73, and the angular movements forward (with the arrow) or backward (against the arrow) produce the necessary movements of the drum 72 for moving forward or backward. A grip-lock 75 may be provided on the handle 74 to coöperate with notches 76 on the rack 77 to preserve any desired position of said handle. The spring 78 holds down the bolt of this lock.

It is to be understood that my invention covers the broad ground expressed in the claims below unlimited by unexpressed conditions and that the various embodiments of my invention herein shown and described are merely illustrative examples of what is covered by my claims.

What I claim is—

1. In a self-propelled vehicle, a polyphase alternating-current generator on said vehicle, a rotary-field driving-motor in circuit therewith and means for varying the connections between said generator and said motor to change the relative number of poles of the two.

2. In a self-propelled vehicle, a polyphase alternating-current generator on said vehicle, means for varying the strength of the field-magnet thereof, a rotary-field driving-motor in circuit with the armature of said generator and means for varying the connections between said generator and motor to change the relative number of poles of the two.

3. In a self-propelled vehicle, a battery and a polyphase motor-generator fed thereby, and a circuit-changer between the two for varying the output of the motor-generator; in combination with a rotary-field driving-motor in circuit with the armature of said motor-generator and means for varying the connections between said motor-generator and motor to change the relative number of poles of the two.

4. In a self-propelled vehicle, a rotary-field induction-motor having an armature exerting a substantially constant magnetic reaction independently of the slip, and means for changing the number of polar points around said motor to change the speed of the vehicle.

5. In a self-propelled vehicle, a rotary-field alternating-current motor having a field-magnet with a continuous winding and an armature whose magnetic reaction is practically independent of the slip; in combination with means for providing polyphase currents and means for changing the points of admission of said currents into the continuous winding of the field-magnet.

6. In an induction-motor, an armature, a magnetic body of high permeability, and a conductor a portion of which is placed so as to act as a working conductor and another portion of which passes through said magnetic body.

7. In an induction-motor, an armature, a body of laminated soft iron and a conductor a portion of which is disposed so as to act as a working conductor and another portion of which passes through said laminated body out of the controlling influence of the field-magnet.

8. In an induction-motor a cylindrical armature, a cylindrical reactive body of high magnetic permeability attached thereto and conductors disposed as working conductors upon said armature and prolonged to pass through said reactive body.

9. In an induction-motor, a cylindrical armature, a concentric cylindrical reactive body of high magnetic permeability attached thereto and closed circuits passing across the face of said armature and through the mass of said reactive body.

10. In an induction-motor, a cylindrical armature, a cylindrical reactive body on one side of said armature and closed circuits passing across the face of said armature and through the mass of said reactive member and comprising a conducting-ring at one end or face of said reactive body.

11. In an induction-motor, a cylindrical armature, a cylindrical reactive body on each side thereof and closed circuits passing across the face of said armature and through the mass of both of said reactive bodies and comprising a conducting-ring at one face of each of said reactive bodies.

12. In an induction-motor, a field-magnet, a cylindrical armature and closed circuits passing across the face of said armature and back through the mass thereof farther away from the field-magnet and out of its controlling influence.

13. In an induction-motor, a field-magnet, a cylindrical armature, closed circuits passing across the face of said armature and back through the mass thereof farther away from the field-magnet and out of its controlling influence and two concentric rings at one end of said armature included in said circuits.

14. In an induction-motor, a cylindrical armature, a concentric reactive body of high magnetic permeability, a conducting-ring at one end of the armature, a second concentric ring at one end of the reactive body and conductors passing from the former of said rings across the face of the armature and then to said second ring through the mass of said reactive body.

15. In an induction-motor, a squirrel-cage armature having two rings on one face, conducting-bars across the face of the armature connected to one ring and reactance-bars passing through the armature connected to the other ring.

16. In the windings of the squirrel-cage armatures of induction-motors, independent closed loops of metal a portion of each of which lies across the working face of said armature.

17. In the windings of the squirrel-cage armatures of induction-motors, sets of inner and outer conducting-bars, an independent electric connection between the bars of each set on one end of the armature and common electric connections for all the sets on the other end of said armature.

EDWIN R. GILL.

Witnesses:
HAROLD S. MACKAYE,
JAMES S. LAING.